United States Patent [19]

Decoursey et al.

[11] 4,314,368

[45] Feb. 2, 1982

[54] RECEIVER FOR PULSE CODE MULTIPLEXED SIGNALS

[76] Inventors: Calvin H. Decoursey, 14310 Rancheros, Reno, Nev. 89511; Todd V. Townsend, 3825 Squaw Valley Cir., Reno, Nev. 89509

[21] Appl. No.: 950,840

[22] Filed: Oct. 12, 1978

[51] Int. Cl.³ ............................ H04J 3/06; H04J 3/12
[52] U.S. Cl. ................................. 370/108; 370/110.1
[58] Field of Search ......... 179/15 BY, 15 BS, 15 AT, 179/16 AA; 361/153, 194; 370/110, 108, 105, 100

[56] References Cited

U.S. PATENT DOCUMENTS

| | | | |
|---|---|---|---|
| 3,542,957 | 11/1970 | Mitchell | 179/15 BY |
| 3,575,557 | 4/1971 | McGowen | 179/15 AF |
| 3,576,947 | 5/1971 | Kruger | 179/15 BS |
| 4,002,845 | 1/1977 | Kaul | 179/15 BS |
| 4,059,731 | 11/1977 | Green | 179/15 BY |
| 4,085,294 | 4/1978 | Thomas | 179/16 AA |

*Primary Examiner*—David L. Stewart

[57] ABSTRACT

Simple and reliable decoding of T-1 type pulse code information is achieved by combining a fast-acting recirculating frame recovery circuit with a simplified signal output register. The frame recovery circuit uses a recirculating 386-bit control word in which all positions which cannot be the main-frame bit position are continuously recorded by the continuous comparison of pairs of incoming data bits spaced 386 bits apart. Following a sufficient number of iterations of the control word to statistically identify all 385 non-main-frame bit positions with a high degree of probability, the remaining unidentified position is read out as the main-frame bit position, and is used to reset the frame clock generator. The signalling pulses recovered from the correctly framed data train are distributed to the proper channel relays by a simplified output circuit which loads the signalling bits into a buffer register at a slow rate dictated by the data train parameters, then unloads the buffer register into the output latches at a rate sufficiently fast to make it impossible for the channel relays to spuriously respond to momentary invalid signals occurring during the unloading process.

7 Claims, 7 Drawing Figures

FIG_1

FIG_1a

FIG_3a

FIG_3b

FIG_5

RECEIVER FOR PULSE CODE MULTIPLEXED SIGNALS

BACKGROUND OF THE INVENTION

The T1-type pulse code multiplexed (PCM) transmission system commonly employed in the telephone industry uses a pulse format consisting of frames comprising 24 eight-bit segments representing the transmitted information on the 24 channels being multiplexed, plus one extra bit interposed between each 24-segment group. The extra bits are alternately main frame bits and signalling frame bits. They are arranged in a pattern such that the main frame bits alternate between "0" and "1" in even-numbered frames, while the signalling frame bits alternate between three successive "0's" and three successive "1's" in odd-numbered frames. One of the basic functions of a PCM receiver is to determine which pulses in the pulse train are the main frame bits and to separate, based on that determination, the 24 channel segments from one another so that each segment can be fed into the proper channel after being decoded.

Circuitry employed for this purpose by the prior art is suitable but relatively complex. In addition, the speed at which frame information is recovered by prior art devices after an out-of-frame condition usually depends on the phase of the incoming signal relative to the receive timing circuitry, so that frame recovery can be quite slow under certain circumstances. In the highly competitive telephone equipment field, simplifications in circuitry which reduce costs while improving (or at least not significantly reducing) reliability or operational speed are often crucial from an economic point of view.

Another basic function of the receiver is to extract the signalling information from the incoming pulse train and to translate this information into the appropriate operational mode of the channel relays associated with each channel. In this respect also, prior art circuitry is operationally adequate but unnecessarily complex.

SUMMARY OF THE INVENTION

The receiver of this invention achieves significant cost reductions, as well as a uniformly fast frame recovery speed, by using substantially simplified apparatus for determining the frame position in a received pulse train and for storing the signalling information in an appropriate register for operating the channel relays, based on that determination.

Specifically, the receiver of this invention achieves rapid framing by continuously comparing each bit of the incoming pulse train with the 386th next following bit, i.e. the corresponding bit of the second next following frame. If the compared bits are logically equal, the incoming bit being compared cannot be a frame bit. If the compared bits are logically opposite, the incoming bit could be, but need not be, a frame bit. To resolve this ambiguity when the frame bit position needs to be determined, the result of each comparison is successively combined with the comparison results of the corresponding bits of the twenty next preceding pairs of frames in such a manner that an output is produced only when all twenty comparisons indicate the possibility of a frame bit. The laws of probability indicate that the odds are only about one in 2,700 that any bit other than the actual frame bit will survive all twenty comparisons.

Once the position of the main frame bits in the incoming pulse train has been established, this information can be used in a conventional manner to locate the signalling frame, i.e. the one frame in every six in which the least significant bit (LSB) of each eight-bit channel segment carries signalling information instead of voice information. Conventional circuitry used for distributing this information to the proper channels includes a 24-bit output latch (parallel in, parallel out) and a 24-bit temporary storage register (serial in, parallel out). During the signalling frame, the temporary storage is filled with signalling information, after which the information is transferred to the output register to provide glitchless signalling to the channels.

The present invention simplifies this circuitry by collecting the signalling information at the normal rate in a buffer (serial in, serial out) and then serially clocking it into the signal output register (serial in, parallel out) at a rate so fast that the channel relays do not have time to spuriously respond. Compared with the conventional circuitry, this approach effectively replaces a 24-bit parallel in, parallel out latch (the output latch of the conventional approach) with a 24-bit serial in, serial out shift register (the buffer of the present invention).

DESCRIPTION OF THE PREFERRED EMBODIMENT

Figure 1:
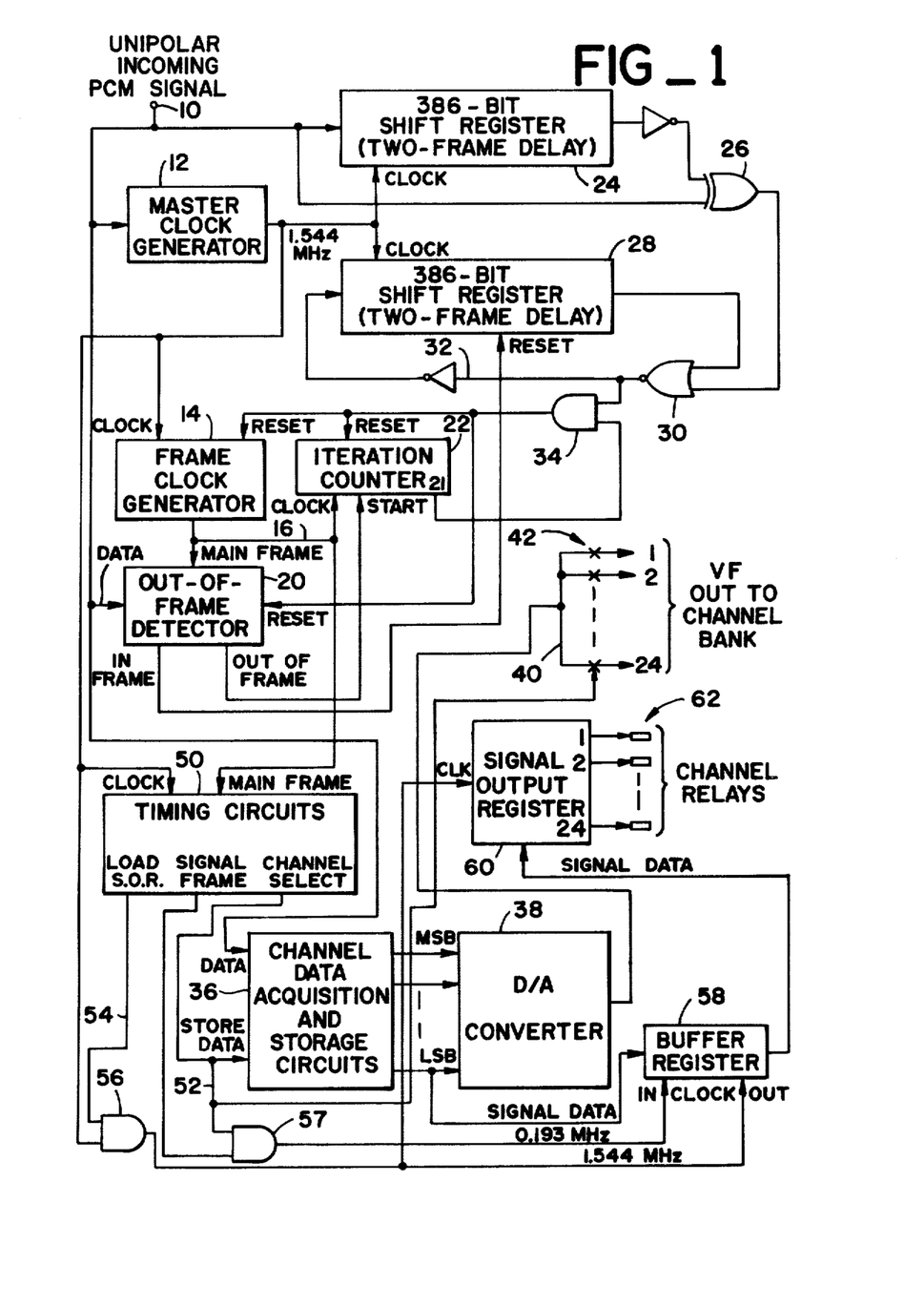
FIG. 1 is a block diagram illustrating the interrelation of the circuits involved in the invention.

The general operation of a preferred embodiment of the receiver of this invention is best shown in FIG. 1. Prior to examining the physical operation of the device as a whole, however, it is advisable to consider the conceptual basis for the operation of the framing circuit of this invention as shown in schematic form in FIG. 1a. Conventionally, the object of any framing circuit in a T1-type PCM receiver is to provide the receiver's internal frame clock generator with a synchronization pulse derived from an incoming, externally generated train of pulse-coded data whenever the receiver's out-of-frame detector determines that the frame clock generator is out of phase with the incoming data train.

In accordance with this invention, the required synchronization pulse is derived from the incoming data train DT with the aid of a second pulse train CW (the "control word") which circulates clockwise (in FIG. 1a) around an endless loop exactly two frames long, at the same bit rate as the data train DT. The comparator CM continuously compares pairs of bits spaced by two frame intervals in the data train DT as the data train moves past the read points RD and RB. If the data bits at RD and RB are identical (both "1" as indicated by cross-latching in FIG. 1a, or both "0"), the comparator CM writes a "1" into the control word CW at write point WC.

Figure 1A:
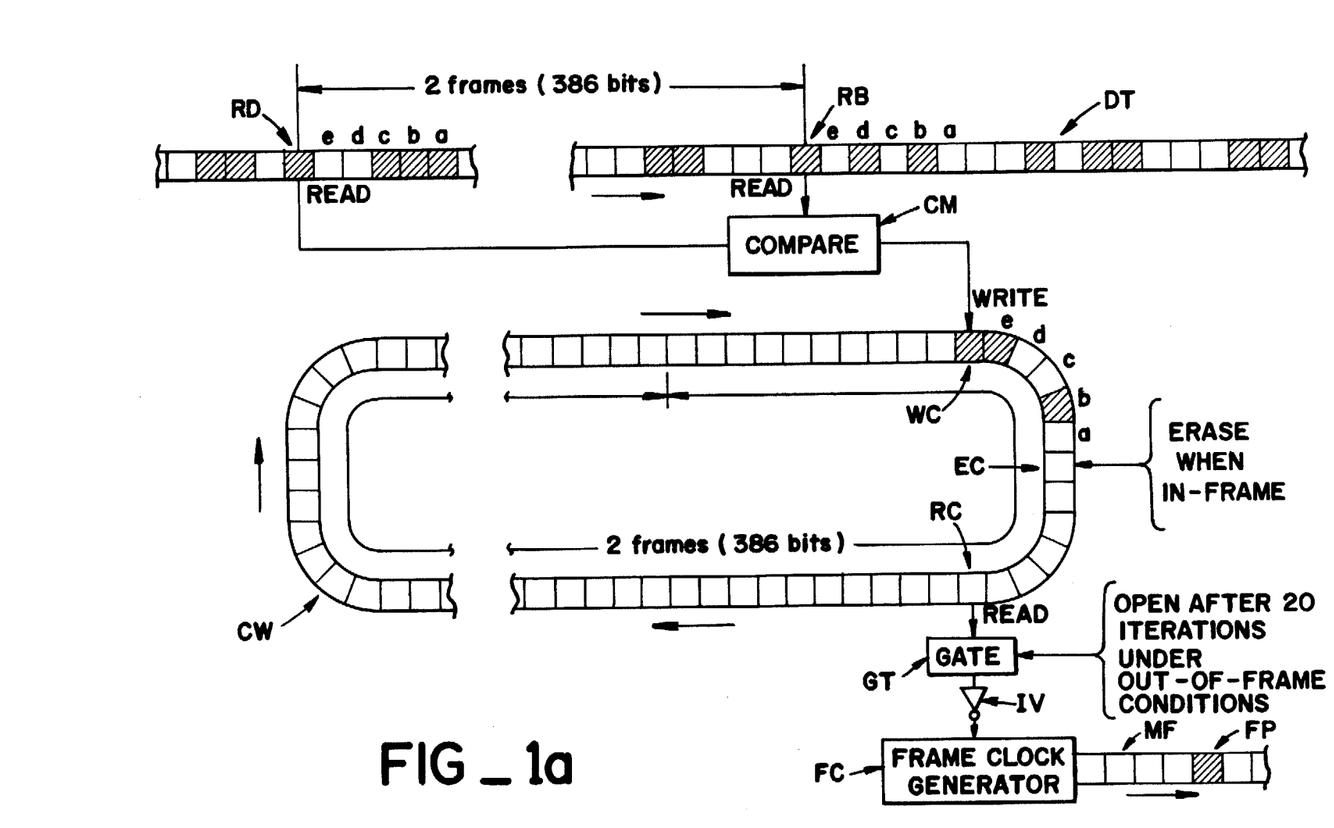
FIG. 1a is a schematic diagram illustrating the recirculating process used in the invention to identify the frame bit.

An examination of the data train DT will show that prior to writing the "1" just discussed, the comparator will have written the data a, b, c, d, e of data train DT.

As long as the frame clock generator is properly in phase with the incoming data train, a "0" is overwritten into all bits of the control word CW at the erase point EC, so that the control word CW remains essentially devoid of information. At the same time, gate GT is closed, so that no synchronizing pulses are delivered to the frame clock generator FC.

When an out-of-frame condition occurs, the overwriting function which erases the control word information at EC is disabled, and the control word CW begins to fill with the comparison data from comparator CM. Inasmuch as the true main-frame bit position in data train DT must always have bits of opposite logic levels at the read point RB, RD as it passes them, a "0" in the control word CW corresponds to a data train position which could be, but need not be, the frame bit position. On the other hand, a "1" in the control word CW corresponds to a data train position which could not possibly be the main-frame bit position.

As the control word CW circulates around its two-frame-interval loop, chances are that the comparator CM will eventually write a "1" into every bit of the control word CW except the bit corresponding to the true main-frame bit position of the data train DT. For example, if c in data train DT is the true main-frame bit position, the comparator CM might write a "1" into control word bit d on perhaps the second iteration and into a on perhaps the fourteenth iteration; i.e. whenever identical bits first occur in the data train DT in positions d or a, respectively. However, no "1" will ever be written into control word position c, as there will never be identical bits in two successive c positions of the data train DT. After 20 iterations of the control word CW around its loop, the mathematical odds are approximately 2700 to 1 that there is only one "0" left in the control word CW.

Following the twentieth iteration of control word CW, gate GT opens and, through inverter JV, feeds a synchronizing pulse to the frame clock generator FC as soon as a "0" in the control word CW passes the read point RC. This synchronizing pulse instantly rephases the frame clock generator, properly positioning the framing pulse FP in the main-frame clock MF produced by the generator FC. It also closes gate GT, enables the overwriting function at EC, and resets the out-of-frame detector 20 (FIG. 1) to watch for the next out-of-frame condition.

It will be noted that even if there are still two "0" bits in the control word CW after twenty iterations, the odds are still fifty-fifty that the first "0" to pass the read point RC is the right one. Consequently, the net odds that the framing circuit of this invention will function correctly in any given instance are approximately 5400 to 1.

It should be noted that in the framing circuit of this invention, frame recovery always occurs during the twenty-first iteration of the control word, i.e. between 5 ms and 5.25 ms after detection of an out-of-frame condition if the main frame bit has been correctly received during this time, regardless of how much the frame clock generator is out of phase with the incoming data train. This substantial constancy of recovery time is a desirable feature in many applications.

Returning now to FIG. 1, the general operation of the receiver of this invention is as follows: The raw PCM data (converted to unipolar form) containing encoded framing information is received from the span line at 10. The incoming pulse train is used to produce a 1.544 MHz master clock in master clock generator 12, which provides the basic timing for all the components of the inventive device.

A main-frame clock generator 14 counts the master clock pulses and puts out a main-frame clock pulse on line 16 at every 386th master clock pulse, i.e. once in every two-frame-long main frame of the T1-type PCM signal. This main-frame clock pulse is used in a conventional manner to synchronize the timing circuits 50 with the incoming pulse train so as to assure the accurate partitioning of the incoming pulse train into meaningful information segments for distribution to the individual multiplexed channels.

To monitor the synchronism between the incoming pulse train and the main-frame clock 16, both are applied to a conventional out-of-frame detector 20. This detector may be a so-called flywheel error detector which is triggered when a predetermined number of successive bits identified by the main-frame clock 16 as frame bits of the incoming data stream fail to conform to the logic criteria which main-frame bits must satisfy. When this happens, (i.e. when the main-frame clock is out of synchronism with the incoming pulse train, or when the main-frame bits are in error), the out-of-frame detector 20 starts an iteration counter 22 which then begins to count the output pulses of main-frame clock generator 14 for a purpose described below.

The raw incoming data is continuously fed into a data shift register 24 which contains 386 bits (two full frames) of information and thus acts as a main frame delay line. The inverted output of data shift register 24 is continuously compared with the incoming signal from span line 10 in an EXCLUSIVE-OR comparison gate 26. Inasmuch as main-frame bits are alternately "1" and "0" in successive main frames, main-frame bits located two full frames apart must always have opposite logic levels. Consequently, a "1" logic level at the output of comparison gate 26 indicates that the data bit then appearing at line input 10 cannot be a main-frame bit.

When an out-of-frame condition is detected by detector 20, the reset signal is removed from a 386-bit control word shift register 28. The control word register 28 thereupon begins to fill with a series of bits representing the output of comparison gate 26. It will be seen that control word register 28 also acts as a two-frame delay line, and that its output is therefore in synchronism, from a framing point of view, with the output of gate 26.

The outputs of comparison gate 26 and of the recirculating control word register 28 are combined by NOR gate 30. The effect of this combination is to put a logic "0" on line 32 whenever the position (in the raw data train) of an incoming data bit has been identified as not being a possible frame position, either directly by comparison gate 26 or from a previous comparison (an even multiple of frame intervals earlier) by combining gate 30.

To illustrate this process, let it be assumed that in an incoming data stream containing random data and proper main-frame pulses whose position in the stream is unknown, half the bit positions in any two-frame segment can statistically be directly identified as non-main-frame bit positions by comparison gate 26. After the first iteration through the recirculating control word register 28, half of the remaining positions will be identified as non-frame bit positions by combining gate 30. Each subsequent iteration of a two-frame segment of positional information from the output of combining gate 30 statistically identifies and rejects one-half of the remaining positions as non-main-frame bit positions, until only the actual frame bit position in the two-frame segment remains unrejected.

Statistically, the odds are even that after the ninth iteration, all non-frame bit positions will have been identified. However, the iteration counter 22 is preferably set to allow twenty full iterations before attempting to reset the frame clock generator 14. At this point, the odds against any non-frame bit position remaining unidentified are about 2700 to 1.

On the twenty-first count of iteration counter 22, AND gate 34 becomes enabled. The next occurrence of a "1" on line 32 identifies the data bit then appearing at line input 10 as a main-frame bit, and the resulting "1" output of gate 34 resets the main-frame clock 16 into synchronism with the incoming data pulse train. As explained previously herein, the odds that the main frame clock has been correctly synchronized with the incoming pulse train are about 5400 to 1, twice the odds that all the non-frame positions have been identified in control word register 28.

The reset operation immediately disables gate 34 resets out-of-frame detector 20, and starts to fill recirculating register 28 with "0's". The framing circuit is now ready for another frame recovery operation if and when needed. It will be noted that the total frame recovery operation consumes twenty-one times two frame intervals, or 5.25 ms in the T1-type telephone system. This time interval (during which information is lost) is short enough to be undetectable by the telephone subscriber.

Figure 2:
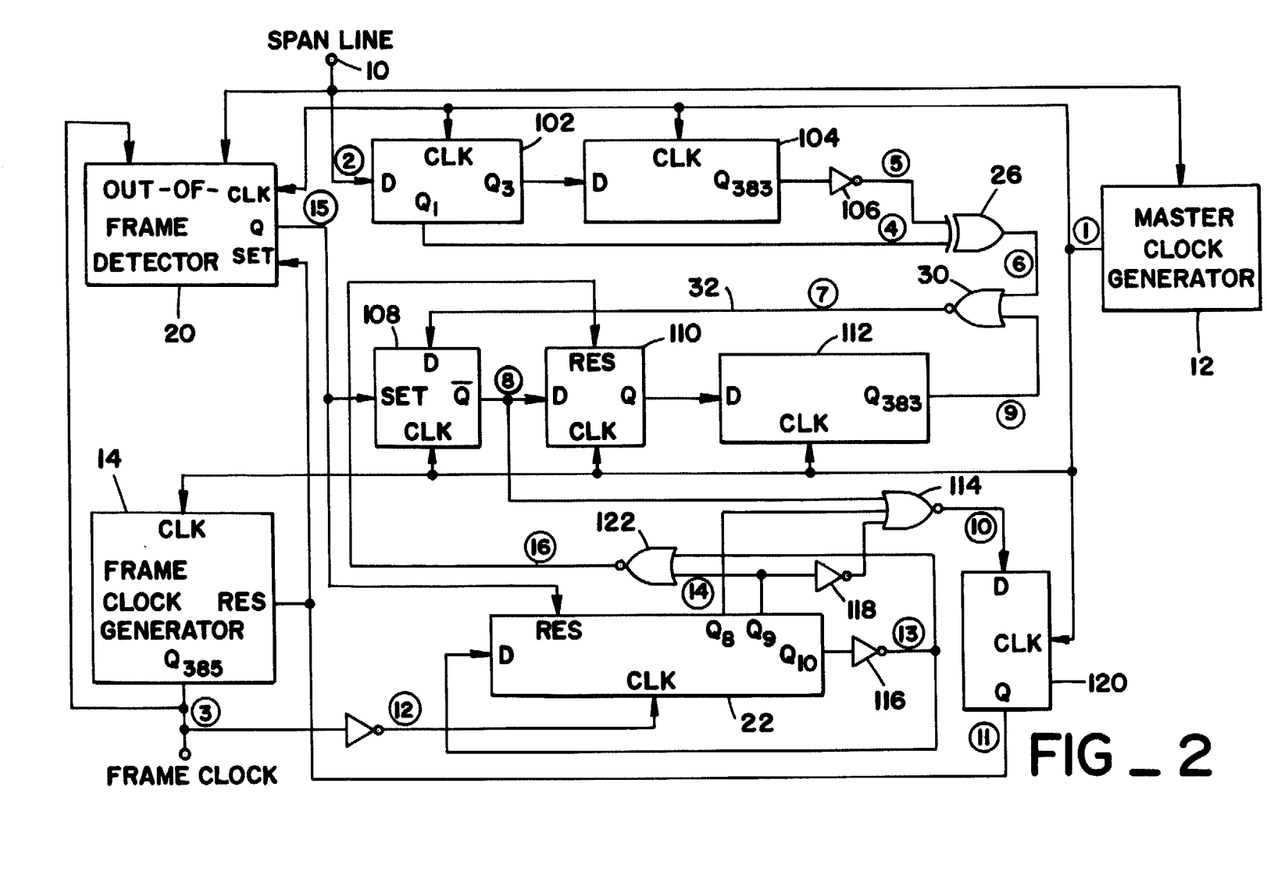
FIG. 2 is a circuit diagram, partially in block form, showing the details of the frame pulse identification circuit of the invention.
Figure 3A:
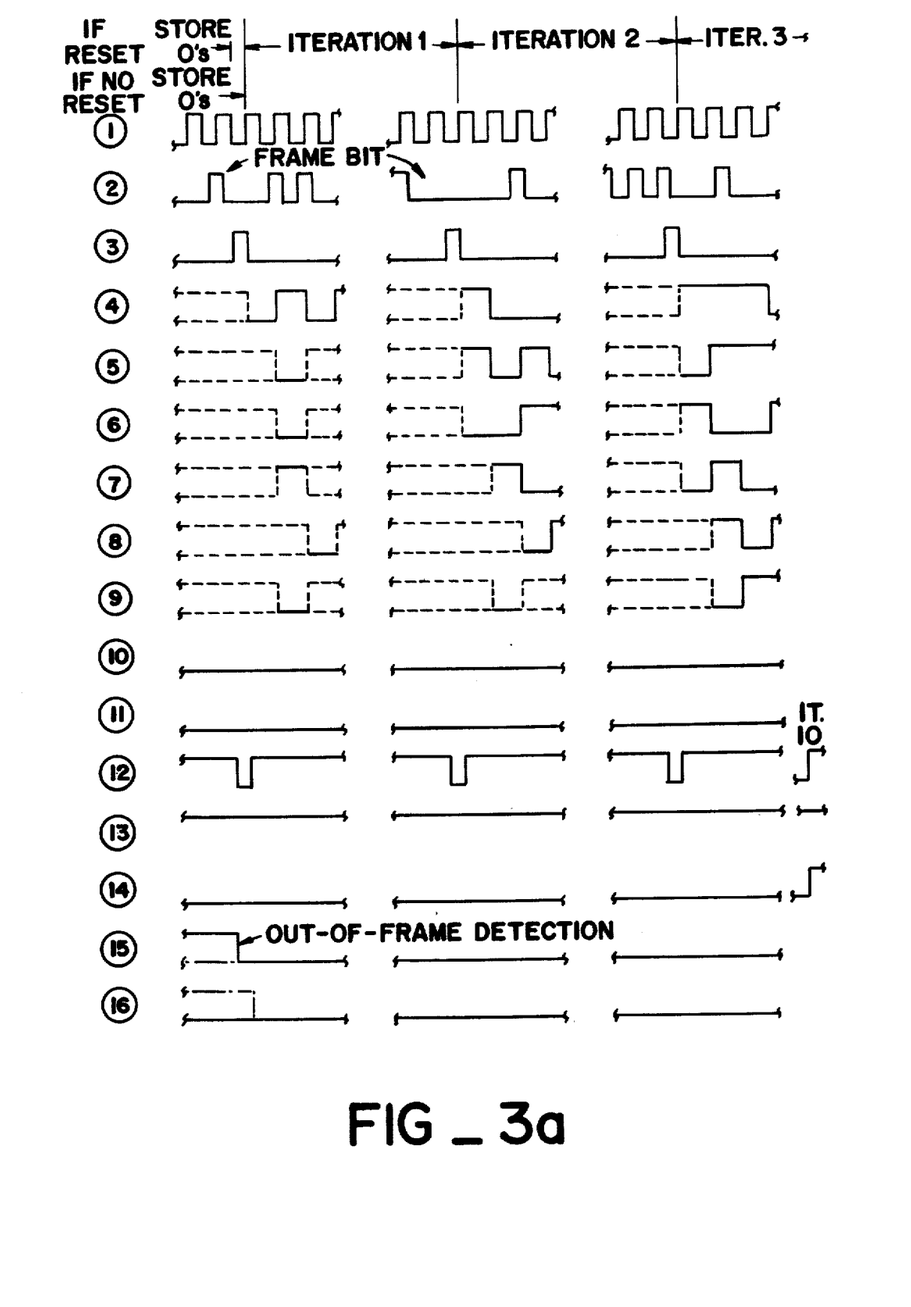
FIG. 3a and FIG. 3b represent a time-amplitude diagram illustrating the signals appearing at various points in the circuit of FIG. 2.
Figure 3B:
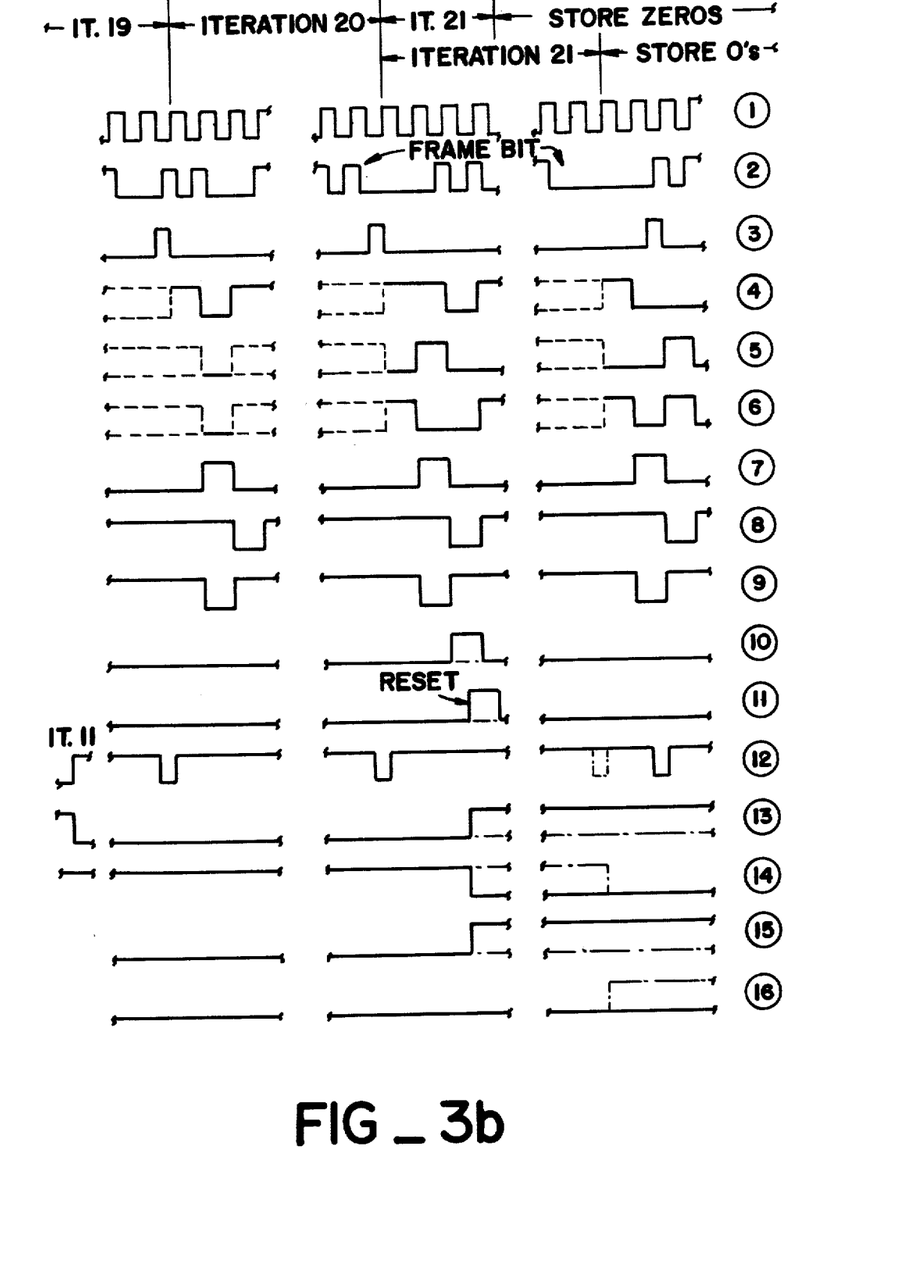

A preferred embodiment of the framing circuits of this invention is shown in more detail in FIG. 2, in which the circled numbers refer to the correspondingly marked time-amplitude diagrams of FIG. 3.

In the embodiment of FIG. 2, the rectified raw pulse train coming in from the span line 10 is used as previously mentioned herein, in a conventional fashion by the master clock generator 12 to extract a 1.544 MHz master clock (diagram #1, FIG. 3) synchronized with the incoming pulse train. The incoming pulse train (diagram #2, FIG. 3) is also applied to the D input of a four-bit shift register 102 whose first two bits ($Q_0$ and $Q_1$) act as a delay line to compensate for a like delay in the operation of the internal circuitry of the conventional out-of-frame detector 20.

Between the $Q_1$ output of four-bit shift register 102 and the final $Q_{383}$ output of 384-bit shift register 104, a 386-bit delay occurs which causes the upper input (diagram #5, FIG. 3) of EXCLUSIVE-OR gate 26 to be exactly two frames (one main frame) behind its lower input (diagram #4, FIG. 3) and inverted with respect to it (due to the action of inverter 106). Inasmuch as the main frame bit is of opposite logic levels at two-frame intervals, the output (diagram #6, FIG. 3) from gate 26 will be high whenever the bit currently appearing at the $Q_1$ of shift register 102 has been identified by gate 26 as not being the main-frame bit, the D input of flip-flop circuit 108 will be low. This condition produces a high Q output from flip-flop 108 one bit interval later (diagram #8, FIG. 3). Propagation of this output through flip-flop 110 and 384-bit shift register 112 results in a high output from the final $Q_{383}$ stage of shift register 112 (diagram #9, FIG. 3) exactly two frames (one full main frame) after the application of the low input to the D terminal of flip-flop 108.

It is possible that when the $Q_{383}$ output of shift register 112 thus goes high, the output of gate 26 may be low. However, the high level of the lower input to gate 30 produces a low input to the D terminal of flip-flop 108, thus forever identifying this bit position in the pulse train as not being the main-frame bit position.

As the data pulse train now continues to circulate through flip-flop 108, 110, shift register 112 and gate 30, each bit position in the data pulse train will eventually be identified by gate 26 as not being the main-frame bit position. Once made, each such identification remains locked in by the action of the $Q_{383}$ output of shift register 112. Eventually, as previously discussed herein, the odds are that the D input to flip-flop 108 will be high only when the bit appearing at the $Q_1$ output of shift register 102 is the main-frame bit.

The three-input NOR gate 114 produces a high output only when all three of its inputs are low. Due to the logic reversal in flip-flop 108, the upper input (diagram #8, FIG. 3) to gate 114 will eventually be low only during the bit interval immediately following the appearance of a main-frame bit at the $Q_1$ output of shift register 102, thus identifying the main-frame bit position.

It will be noted that the recirculating loop made up of flip-flops 108, 110, shift register 112 and gate 30, can operate only when the out-of-frame detector 20 detects an out-of-frame condition by comparing the presumed main-frame bits of successive main frames of the incoming pulse train, as identified by the frame clock generator 14, and finding a significant discrepancy. When this happens, the Q output (diagram #15, FIG. 3) goes low and removes the SET input of flip-flop 108, allowing flip-flop 108 to start responding to its D input. Simultaneously, the RES input of iteration counter 22 goes low, and counter 22 is ready to start advancing one count each time a frame clock pulse appears at output $Q_{385}$ of the frame clock generator 14, i.e. once every two frames of the data pulse train.

At the end of the eleventh iteration of the recirculating loop 108-110-112-30, the Q10 output of counter 22 goes high and, due to inverter 116, causes the D input of counter 22 (diagram 13, FIG. 3), to go low. At the end of the twentieth iteration, the $Q_8$ output of counter 22 goes low while its $Q_9$ output is still high. Due to the action of inverter 118, the middle and lower inputs of gate 114 now are both low throughout the twenty-first iteration until the $Q_9$ output of counter 22 also goes low at the end of the twenty-first iteration of the recirculating loop 108-110-112-30.

As the recirculating pulse train goes through its twenty-first iteration, the main-frame bit position eventually reaches the Q output of flip-flop 108, and the top input of gate 114 also goes low. At that point, the output (diagram #10, FIG. 3) of gate 114 goes high, and the Q output of reset flip-flop 120 resets the frame clock generator 14 into synchronism with the detected main-frame bit position and sets the out-of-frame detector 20 to end the frame recovery operation and go back to checking the incoming pulse train for another out-of-frame condition.

In case of a persistent loss of meaningful incoming data, it is possible that the twenty-first iteration of the recirculating loop 108-110-112-30 might be reached without identifying any bit position as the main frame bit position. If this happens, no reset will occur (dot-dash line condition of diagrams #10 through 16, FIG. 3), and another frame recovery operation will have to be initiated without any action from out-of-frame detector 20. To accomplish this, NOR gate 122 produces an output (diagram #16, FIG. 3) during a twenty-second iteration (when $Q_9$ of counter 22 has gone low but $Q_{10}$ is still high) which resets flip-flop 110 so as to feed a sequence of 386 zeros into shift register 112. At the end of the twenty-second iteration, $Q_{10}$ of counter 22 goes low, and the frame search can now start over again with iteration 1. If a reset does occur and out-of-frame detector 20 goes out the search mode, its Q output goes high again, resetting iteration counter 22, and continuously feeding zeros to flip-flop 110 until the next out-of-frame detection by energizing the SET input of flip-flop 108.

Once the main-frame bit position in the incoming data stream has been determined, conventional channel data acquisition and storage circuitry 36 can be used to separate the incoming data stream into individual segments representing the intelligence contained in the multi-plexed data stream. This intelligence is then ready to be distributed to the appropriate subscriber channels by the inventive output register now to be described.

In the T1-type PCM telephone system, signalling information is transmitted by replacing, once every six frames, the least significant bit (LSB) of each channel data segment, with a switching bit indicating the desired status of the channel relay. The frame in which signalling information is transmitted is identified by signalling-frame bits which appear in the PCM pulse train midway between the main-frame bits. As described above, the main-frame bits are identified by the sequence 101010 repeated indefinitely, while the signalling-frame bits are identified by the sequence 111000 repeated indefinitely. The signalling frames are the frames following each first "1" and each first "0" of this sequence.

Consequently, referring again to FIG. 1, the outputs of main-frame clock generator 14 and master clock generator 12 can be combined and processed by conventional timing circuits 50 (consisting, typically, of a variety of pulse counters) to provide control signals adapted to operate the channel data acquisition and storage circuits 36 as well as the electronic channel switches 42 in the proper sequence and at the proper time. These control signals are schematically represented in FIG. 1 as timing circuit output 52.

Inasmuch as an entire frame (about 125 μs) is required for the acquisition of signalling information for all twenty-four channels, it has previously been necessary, in order to avoid spurious relay operation during the signalling frame, to acquire the information in a serial-in, parallel-out shift register, and then clock it into a parallel-in, parallel-out latching register so as to leave the acquisition register free for the next acquisition. Aside from the duplication of function, this solution left something to be desired because while serial-in, parallel-out registers are commonly available off-the-shelf in 8-bit chips, parallel-in, parallel-out registers are commonly available only in 4-bit chips. Consequently, a complete prior art signal output circuit required nine integrated circuit chips.

In contrast, the signal output circuit of this invention, by eliminating the latching stage, requires only four chips: three 8-bit serial-in, parallel-out registers connected in series to form the 24-bit signal output register and one (also commonly available) serial-in, serial-out twenty-four bit buffer register.

In accordance with the invention, the timing circuits 50 are provided with an additional output 54 timed to go high for twenty-four master clock cycles once every six frames immediately following the end of the signalling frame. The output 54 is ANDed with the output of master clock 12 in gate 56 to provide a burst of twenty-four pulses at the 1.544 MHz master clock rate once every six frames. These pulses are used to serially clock the contents of a twenty-four bit buffer shift register 58 into the twenty-four bit signal output shift register 60.

During each signalling frame, the LSB's of the twenty-four channels are serially loaded into buffer register 58 in synchronism with the output 52 of timing circuits 50. Thus, it will be seen that buffer register 58 is loaded at the channel switching rate of about 0.193 MHz, but is read out at the master clock rate of 1.544 MHz. The result of this arrangement is that the signal output register 60 acquires its contents in about 15.5 μs. During this interval, the outputs of register 60 are invalid part of the time, but the interval is short enough to prevent any spurious relay operation by invalid output signals. Consequently, the individual bits stored in signal output register 60 can be used directly to operate the channel relays 62.

Figure 4:
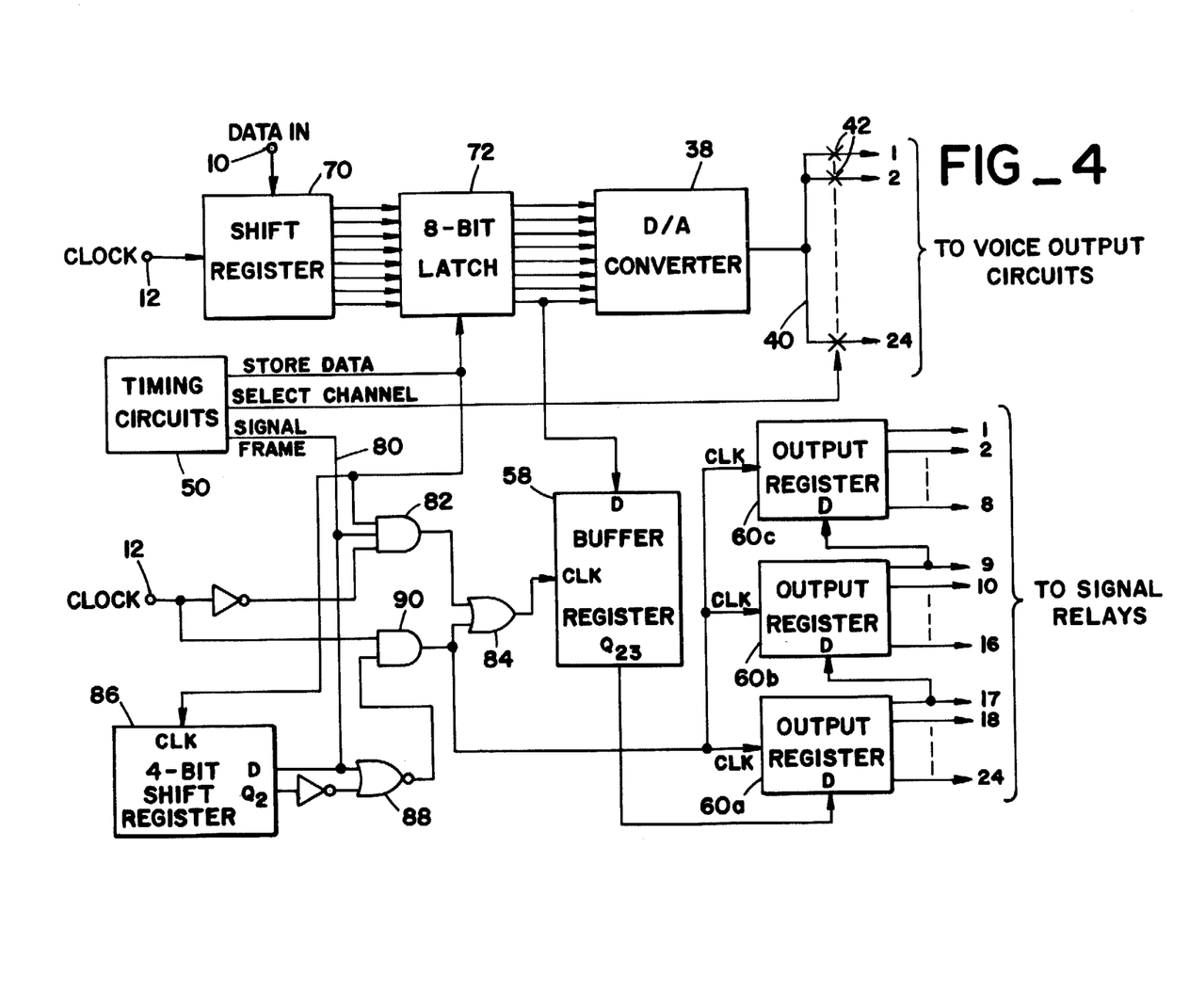
FIG. 4 is a circuit diagram, partially in block form, illustrating the signal output circuitry of this invention.
Figure 5:
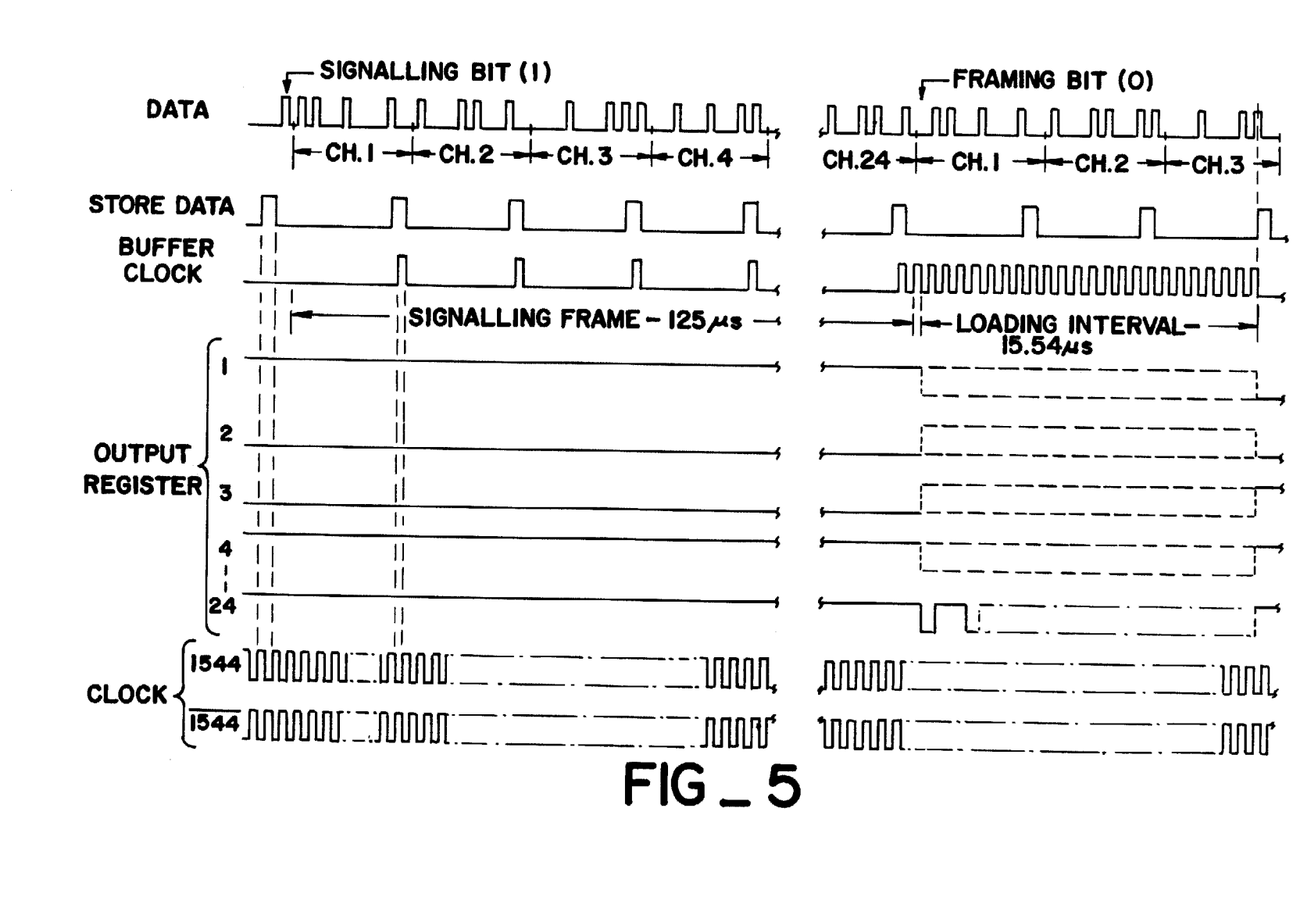
FIG. 5 is a time-amplitude diagram illustrating the signals appearing at various points in the circuit of FIG. 4.

The functioning of the output circuits is illustrated in more detail in FIGS. 4 and 5. The incoming data pulse train, illustrated in the topmost time-amplitude diagram of FIG. 5, is conventionally fed directly from the span line 10 into a shift register 70 (FIG. 4) under the control of the master clock 12, (illustrated in the next-to-last time-amplitude diagram of FIG. 5). The conventional timing circuits 50, under the control of the frame clock 16 (FIG. 1) synchronized by the framing circuits of this invention previously described herein, produce a store-data pulse once every eighth bit of the data portion of each frame, i.e. whenever the shift register 70 contains a complete eight-bit word of channel information, so as to parallel-load those eight bits into latch 72.

The contents of latch 72 are converted to analog form by D/A converter 38 and are applied to the voice output bus 40. The particular voice output channel connected to bus 40 at any given moment is determined by the state of electronic switches 42 operated in a conventional manner by the timing circuits 50.

During the signalling frame, the timing circuits 50 energize line 80, which constitutes one input of the three-input AND circuit 82. A second input to AND circuit 82 is the store-data pulse which, as pointed out above, occurs every eighth bit in the data portion of each frame. The clocking edge of the store-data pulses (illustrated in the second diagram of FIG. 5) coincides in time with the center of the least significant bit of each channel information word of the data pulse train.

The third input to AND circuit 82 is the inverted master clock (last time-amplitude diagram of FIG. 5). Consequently, the output of AND circuit 82 is the buffer input clock (left side of third diagram of FIG. 5) which is applied to the clock input of buffer register 58 through OR gate 84 to serially load the LSB's of the twenty-four data channels into buffer register 58 during the signalling frame. The clocking action, as will be noted from FIG. 5, occurs on the falling edge of the buffer clock pulses.

During the loading of buffer register 58, the output at $Q_{23}$ of buffer register 58 is meaningless. However, due to the fact that the output register 60 a,b,c, are not being clocked during this time, this meaningless output is simply lost and does not affect the output register 60 a,b,c.

At the end of the signalling frame, line 80 goes low. The $Q_2$ output of four-bit shift register 86 is still high, but, due to the inversion of the $Q_2$ output, both inputs of NOR gate 88 are now low, and AND gate 90 allows the master clock pulses to propagate to the clock inputs of output registers 60 a,b,c, and also through OR gate 84 to the clock input of buffer register 58. This constitutes the buffer output clock (right side of third diagram in FIG. 5) which causes the contents of buffer register 58 to be serially loaded into the signal output register 60 consisting, preferably, of three eight-bit serial-in, parallel-out registers 60a, 60b, 60c connected in series.

The parallel output of signal output register 60 is directly usable to operate the signal relays 62 (FIG. 1) of the telephone switching equipment (not shown), as it is invalid only during the 15.54 μs loading interval (FIG. 5) following the end of a signalling frame. This interval is too short for any relay to operate in response to an invalid output.

The diagrams of FIG. 5 labelled "OUTPUT REGISTERS" illustrate the state of the outputs of signal output register 60, with the spurious outputs during the loading interval being indicated by dotted-line boxes for channels 1 through 4, and being partially shown in full lines for channel 24.

It will be seen that the above-described signal output register arrangement, by substantially reducing the number of integrated circuit chips required to perform the output functions, not only results in a significant cost saving, but also substantially reduces the chances of a system breakdown due to chip failure.

What is claimed is:

1. A frame recovery circuit for T-1 type PCM receivers, comprising:
    (a) comparison means for comparing, in a received PCM data pulse train, pairs of bits spaced an integral multiple of main frame intervals apart, said comparison means being arranged to provide an indicative output when the comparison indicates that the bits being compared cannot be main-frame bits;
    (b) bit storage means arranged to store a control word having a length equal to an integral multiple of the number of bits in a main frame;
    (c) write means connected to said comparison means and to said bit storage means, said write means being reiteratively operatively connected to successive bits of said control word in synchronism with the comparison of successive pairs of data train bits by said comparison means, and said write means being arranged to record an indication in said control word whenever said comparison means provide said indicative output;
    (d) out-of-frame detection means arranged to operatively initiate a series of iterations of said write means along said control word;
    (e) read means reiteratively operative connected to successive bits of said control word in synchronism with the comparison of successive pairs of data train bits by said comparison means, said read means being arranged to provide a normally blocked indicative output whenever the control word bit being read is devoid of said indication recorded therein by said write means;
    (f) counting means arranged to count the number of iterations of said write means initiated by said out-of-frame detection means;
    (g) gating means operatively connected to said counting means and arranged to unblock said indicative output of said read means following completion of a predetermined number of said iterations; and
    (h) erasing means operatively connected to said counting means and arranged to delete said indications from said control word following completion of a predetermined number of said iterations.

2. The apparatus of claim 1, in which said integral multiple in said comparison means is one.

3. The apparatus of claim 1, in which said integral multiple in said bit storage means is one.

4. The apparatus of claim 1, in which said bit storage means is a shift register whose input and output are interconnected.

5. In a PCM receiver, a method of operating channel relays driven by continuous parallel output register means, said channel relays being able to respond only to output changes persisting for longer than a predetermined time interval, said method comprising the steps of:
    (a) serially storing a group of signalling bits from the received PCM pulse train in a temporary storage location at the rate at which they occur in the PCM pulse train over a time period greater than said predetermined interval; and
    (b) serially unloading said group of stored signalling bits from said first temporary storage location and serially storing them in said output register means within a time period shorter than said predetermined interval.
    (c) continuously operating the channel relays in parallel in accordance with the signalling bits stored in said second storage location.

6. A signal output circuit for PCM receivers, comprising:
    (a) means for extracting signalling bits from a received PCM data pulse train;
    (b) output register means arranged to be serially loaded and to provide continuous parallel outputs;
    (c) a plurality of channel relay means individually operated by said parallel outputs, said channel relay-means being able to respond only to changes in said outputs persisting for more than a predetermined time interval;
    (d) buffer register means connected to said extracting means and to said output register means; and
    (e) clocking means connected to said buffer register means and arranged to serially load a group of extracted signalling bits serially into said buffer register over a time period greater than said predetermined interval, and to serially unload said group of extracted signalling bits from said buffer register into said output register means within a time period shorter than said predetermined interval.

7. A receiver for T-1 type PCM systems, comprising:
    (a) comparison means for comparing, in a received PCM data pulse train, pairs of bits spaced an integral multiple of main frame intervals apart, said comparison means being arranged to provide an indicative output when the comparison indicates that the bits being compared cannot be main-frame bits;
(b) bit storage means arranged to store a control word having a length equal to an integral multiple of the number of bits in a main frame;
(c) write means connected to said comparison means and to said bit storage means, said write means being reiteratively operatively connected to successive bits of said control word in synchronism with the comparison of successive pairs of data train bits by said comparison means, and said write means being arranged to record an indication in said control word whenever said comparison means provide said indicative output;
(d) out-of-frame detection means arranged to operatively initiate a series of iterations of said write means along said control word;
(e) read means reiteratively operatively connected to successive bits of said control word in synchronism with the comparison of successive pairs of data train bits by said comparison means, said read means being arranged to provide a normally blocked indicative output whenever the control word bit being read is devoid of said indication recorded therein by said write means;
(f) gating means operatively connected to unblock said indicative output of said read means when there is at least a predetermined probability that only one bit of said control word is devoid of said indication;
(g) erasing means operatively connected to delete said indications following an iteration during which said indicative output of said read means is unblocked;
(h) means for extracting signalling bits from said received PCM data pulse train;
(i) output register means arranged to be serially loaded and to provide continuous parallel outputs;
(j) a plurality of channel relay means individually operated by said parallel outputs, said channel relay means being able to respond only to changes in said outputs persisting for more than a predetermined time interval;
(k) buffer register means connected to said extracting means and to said output register means; and
(l) clocking means connected to said buffer register means and arranged to serially load a group of extracted signalling bits serially into said buffer register over a time period greater than said predetermined interval, and to serially unload said group of extracted signalling bits from said buffer register into said output register means within a time period shorter than said predetermined interval.

* * * * *